July 14, 1970  J. R. STEIGERWALD  3,520,575
AUTOMATIC BRAKE CONTROL SYSTEM
Filed July 12, 1968  3 Sheets-Sheet 1

INVENTOR.
JOHN R. STEIGERWALD
BY
Oldham & Oldham
ATTORNEYS.

United States Patent Office 3,520,575
Patented July 14, 1970

---

3,520,575
AUTOMATIC BRAKE CONTROL SYSTEM
John R. Steigerwald, Canton, Ohio, assignor to The Goodyear Tire & Rubber Company, Akron, Ohio, a corporation of Ohio
Filed July 12, 1968, Ser. No. 744,547
Int. Cl. B60t 8/08
U.S. Cl. 303—21
10 Claims

ABSTRACT OF THE DISCLOSURE

This invention relates to an anti-skid brake system preferably for a rotatable vehicle wheels and the like, and more particularly, is concerned with apparatus of this type in which mechanism is provided to allow a maximum braking pressure to be applied without producing a skid condition. This invention incorporates the features of electrically metering the hydraulic pressure to the brakes, limiting the vehicle deceleration rate to some predetermined maximums so that wheel support loading is not excessive, and providing a current control to insure a uniform and reliable anti-skid operation to the system.

---

The general object of the invention is to provide a new and improved automatic brake control system particularly designed for aircraft which utilizes substantially conventional anti-skid techniques for pressure control to the brakes, but where an overriding signal is developed indicating a maximum permissible deceleration rate to the aircraft so that excessive landing gear loading does not take place.

A further object of the invention is to provide an automatic braking system associated with a substantially conventional anti-skid unit which is lighter in weight and more reliable in operation, and which utilizes an electrically controlled brake actuating pedal to achieve these objects.

The aforesaid objects and other objects of the invention which will become apparent as the description proceeds are achieved by providing an automatic brake control system for a wheel which comprises brake means associated with the wheel, means to manually actuate the brake means, first circuit means to measure the rate of wheel rotation, second circuit means to limit the means to actuate the brake means based on the information from the first circuit means which is characterized by a third circuit means to limit the rate of aircraft deceleration to a predetermined maximum that acts as an overriding control to the second circuit means.

For better understanding of the invention, reference should be had to the accompanying drawings wherein.

Figure 1:
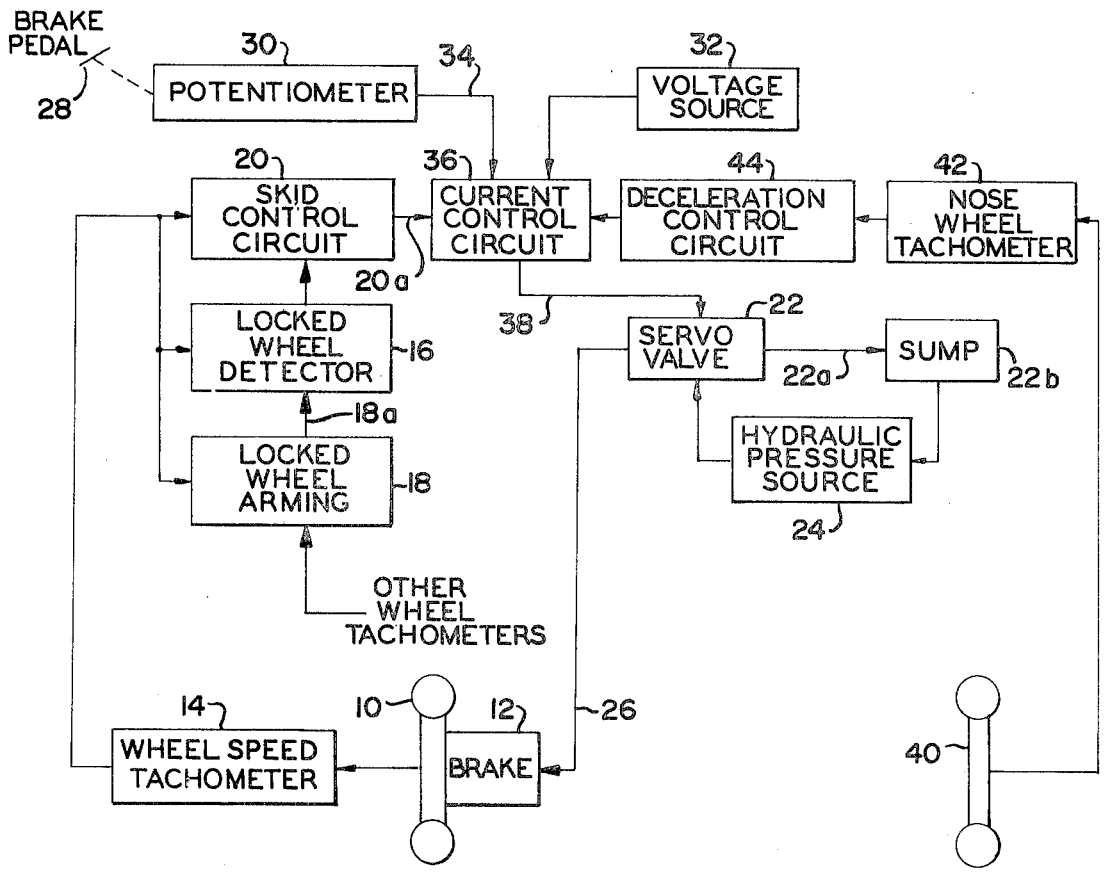
FIG. 1 is a block diagram schematic view of the overall components associated in the novel system of the invention.

While the block diagram of FIG. 1 illustrates a single system dealing with only a single wheel, it is to be particularly understood that the invention is most applicable to incorporation with aircraft, and that in all probability there will be a system like that shown in FIG. 1 for each set of wheels mounted associated with each landing gear except that each wheel has its own separate system as far as wheel speed generating components. Thus, it is to be understood that the adaptation of the disclosure set forth below to a multiple wheel and multiple landing gear structure is well within the qualification of those acquainted with this art.

With reference to the form of the invention illustrated in FIG. 1 of the drawings, the numeral 10 indicates generally an aircraft wheel with an associated brake 12. The wheel drives a wheel speed tachometer 14 in a direct coupling relationship, that produces an electrical signal directly representing the rotation rate of the wheel 10, at any instant in time. This electrical signal is sent to a locked wheel detector 16, a locked wheel arming circuit 18, and a skid control circuit 20. These components 16 to 20 are conventional to anti-skid circuits. The locked wheel detector 16 in combination with the locked wheel arming circuit 18 causes brake pressure to be dumped completely whenever wheel speed drops below about 12 m.p.h. while the aircraft speed is above 20 m.p.h. The locked wheel arming circuit 18 is energized at speeds above 20 m.p.h. by signals from the generator 14. While in the energized condition, the locked wheel arming circuit 18 sends a signal to the locked wheel detector circuit 16. If the associated wheel speed is above 12 m.p.h., the locked wheel detector circuit 16 blocks the locked wheel arming signal from passing to the skid control circuit 20 over line 18a. If the associated wheel speed drops below 12 m.p.h., the locked wheel detector circuit 16 closes and passes the signal from the locked wheel arming circuit onto the skid control circuit where it causes a full dump signal to be sent to a servo valve 22.

The skid control circuit 20 is a substantially conventional circuit operating on an electrical signal indicating the rotation rate of the wheel 10. For further details on the circuit 20, reference should be made to U.S. Letters Patent 3,034,836 and 3,026,148, all assigned to the same assignee as the instant application. The servo valve 22 actually serves to meter a hydraulic pressure source 24 for passage over line 26 to brake 12.

Initially, the actuation of servo valve 22 is accomplished by the pilot or other operator of the vehicle by manual positioning of a brake pedal 28. The pedal 28 physically connects into a potentiometer 30. The potentiometer 30 is supplied with a voltage source 32 whereby the electrical output from the potentiometer 30 over line 34 is a portion of the input voltage 32, dependent upon the position of the brake pedal 28 as it actuates potentiometer 30. In the non-actuated position, there will be a maximum output over a line 34, and this output will gradually decrease dependent upon the actuating position of pedal 28.

The output over line 34 is sent to a current control circuit 36, which provides some maximum pressure limits and speed related limits to the electrical signal output over line 38 which actuates servo valves 22. When the brake pedal 28 is in the full up position, the potentiometer 30 sends a full voltage signal to the current control circuit 36 which in turn sends a full dump current signal to the servo valve. The dump from servo valve 22 is over a line 22a and into a sump 22b. As the brake pedal 28 is depressed, the voltage output signal from the potentiometer 30 decreases proportionately. This causes the current to the servo valve to decrease proportionately which allows a proportional increase in the brake pressure.

If the braking effort applied is greater than that which can be supported by the runway conditions, incipient wheel skids will occur. These will be detected by changes in the voltage of the tachometer 14 which is monitored by the skid control circuit 20. The skid control circuit 20, acting on the voltage signals from the generator 14, sends a correction current over line 20a to the servo valve. This correction current then reduces the brake pressure as required to limit the wheel skids. During a maximum effort stop, the skid control circuit 20 will continuously regulate the current to the servo valve 22 so that the brake pressure is held close to the optimum level for the shortest possible stop distance without skidding.

A feature of the invention is achieved by insuring that the deceleration rate of the aircraft is prevented from exceeding a certain percent of gravity by a predetermined specification limit, this being accomplished by limiting the maximum available brake pressure throughout the landing roll as a function of aircraft deceleration. This is accomplished by providing some way to determine aircraft ground speed. One convenient structural application to this end would be by a nose wheel 40 driving through a nose wheel tachometer 42 and into a deceleration control circuit 44. The circuit 44 feeds into the current control circuit 36 to provide the proper regulation of the output signal from circuit 36 over line 38 to servo valve 22.

CURRENT CONTROL CIRCUIT

Figure 2:
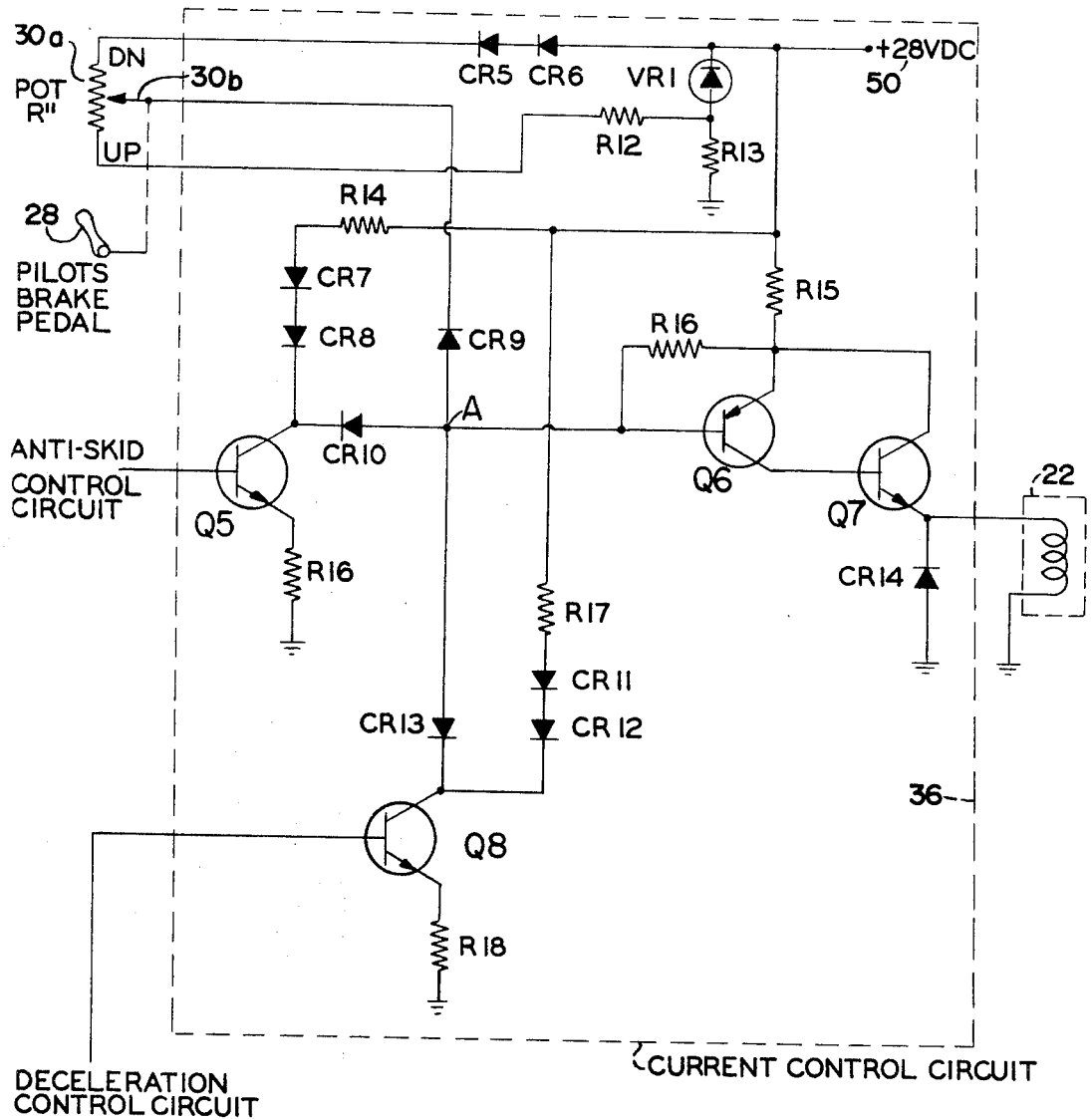
FIG. 2 is a detailed schematic of the current control circuit shown as a block in FIG. 1.

The electrical components of the current control circuit 36 are illustrated in FIG. 2 of the drawings. Specifically, the circuit 36 is illustrated by dotted lines and comprises a voltage regulator or Zener diode VR1, 4 transistors Q5–Q8, a plurality of diodes CR5–CR14, and a plurality of resistors R12–R18. The potentiometer 30 comprises a variable resistor 30a with the pilot's brake pedal 28 acting directly on a variable connector 30b. The resistor 30a is connected through temperature compensation diodes CR5 and CR6 on one side to a +28 volt DC voltage source 50. The resistor 30a with a 28 volt DC source potential will normally be approximately a 10,000 ohm resistor with the circuit design to provide approximately 5.8 volts thereacross to achieve the desired operational characteristics of the invention.

It should be noted that the down position of pedal 28 places arm 30b so as to pick off nearly a zero volt potential from resistor 30a, while in the up position, a maximum voltage pick-off is received by arm 30b. The potential pickoff on arm 30b passes through a diode CR9 and to the base of transistor Q6. The purpose of voltage regulator VR1 is to provide a fixed voltage across the potentiometer 30. The resistor R12 is to provide fine calibrations in voltage across the potentiometer, depending upon the characteristics of the circuit. R13 is a current limiting resistor for VR1. Essentially CR5 and CR6 are temperature compensation diodes which really compensate for the temperature characteristics of diode CR9 and the emitter-base junction of transistor Q6.

Because of the interconnected relationship of the circuit as illustrated in FIG. 2, the potential picked off by arm 30b and provided at the base of transistor Q6 is impressed across resistor R15. R16 is a leakage bypass for transistor Q6, which is a conventional technique in the art. CR14 suppresses inductive kickoffs from the servo valve 22 which would overload amplifying transistor Q7 and cause possible transistor breakdown. The transistor Q7 amplifies the current passage through Q6, all in a conventional manner.

Hence, it should be seen that with the arm 30b in the down position, there is no potential pickoff, and hence no potential across R15, and hence substantially no conduction of current through Q6 and Q7 to the servo valve. As the brake pedal is released towards the up position, the potential occurring on the base of Q6 gradually increases which gradually of course increases the current passage through the transistor combination Q6 and Q7, thereby energizing servo valve to cause its partial and then full dumping as complete release of the brake pedal takes place.

ANTI-SKID CONTROL CIRCUIT INPUT

The anti-skid control circuit input is sent to the base of transistor Q5 and simply operates to alter the conduction of transistor combination Q6–Q7, as is shown in the circuit diagram. Specifically, the follower is connected directly to the voltage source 50 through resistor R14 and temperature compensating diodes CR7 and CR8. The resultant current flow through the transistor Q5 (the voltage across R14) which automatically defines the potential at the common junction A into the base of transistor Q6. Diodes CR7 and CR8 are utilized for temperature compensation purposes in the same manner as diodes CR5 and CR6. R16a is again utilized to act as a current limiting resistor for Q5. Thus, in other words, the signal presented to the base of Q5 operates as a simultaneous control onto the voltage impressed across R15 and hence a direct control of the current passage through Q6 and Q7.

DECELERATION CONTROL CIRCUIT INPUT

The deceleration control circuit input is provided to the base of transistor Q8, and its input to control the potential at the base of transistor Q6 is exactly the same as in the anti-skid control circuit input described above. It operates in conjunction with resistor R17, diode CR11, CR12 and CR13, to provide a simultaneous control voltage to determine the voltage impressed across resistor R15, and hence the current conducting properties of transistors Q6 and Q7.

Thus, it should be understood that an increase in current flow through both transistors Q5 and Q8 will cause an increase in voltage potential across resistors R14 and R17, respectively, and hence an increase in voltage across resistor R15, and hence an increase in the amount of current conducted through Q6 and Q7, and therefore a further dumping caused by servo valve 22, with a consequent reduction in brake pressure to the aircraft brakes.

DECELERATION CONTROL CIRCUIT

Figure 3:
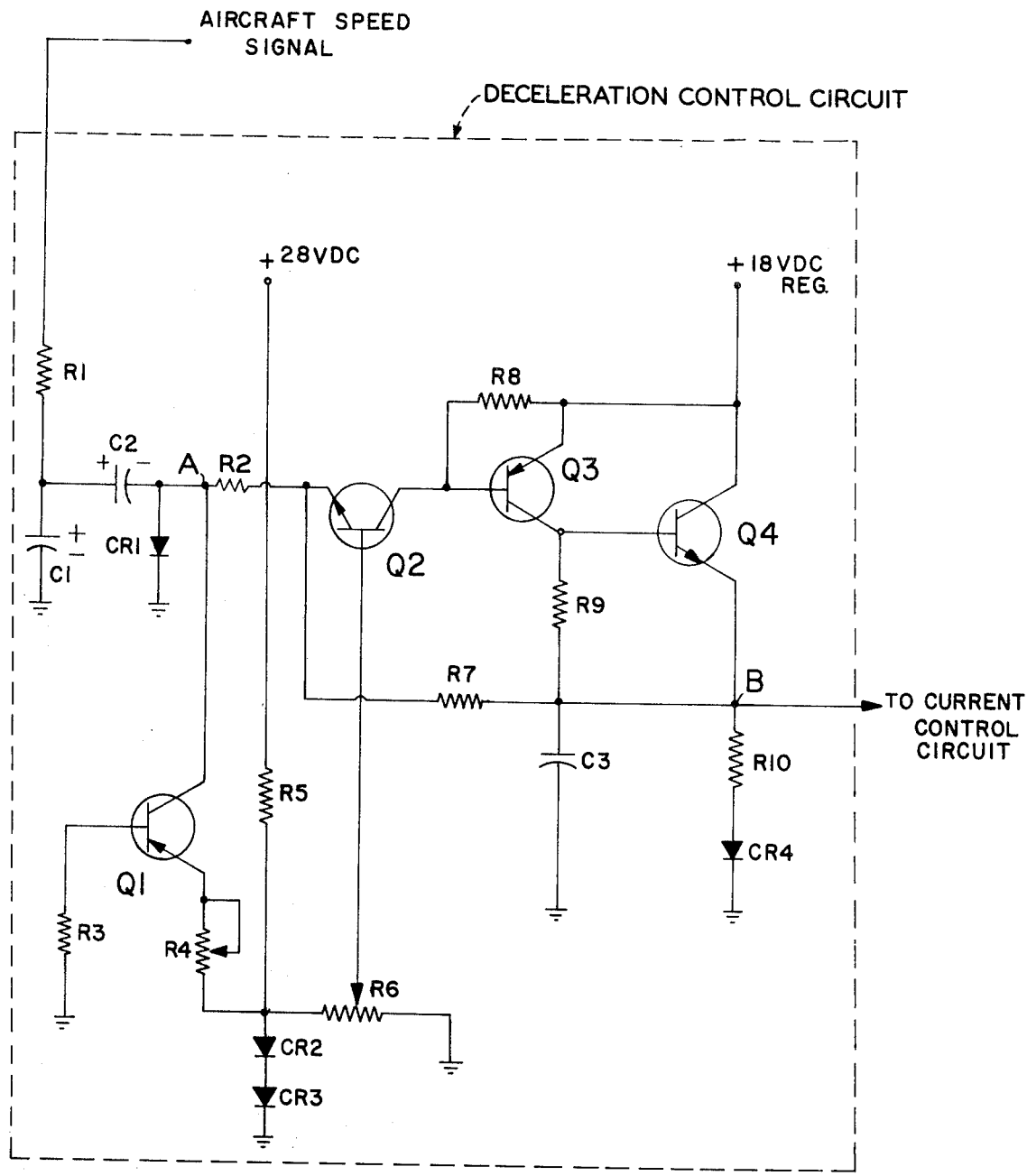
FIG. 3 is a schematic diagram of the deceleration control circuit associated with the nose wheel speed detector in FIG. 1.

The deceleration control circuit is indicated by the dotted block in FIG. 3, and comprises a plurality of resistors R1–R10, a plurality of transistors Q1–Q4, a plurality of diodes CR1–CR4, and a plurality of capacitors C1–C3. Beginning to the left side of the circuit, an aircraft speed signal provides an input which from the drawing of FIG. 1 comes from the nose wheel tachometer 42, but might possibly come from a multiple main wheel tachometer combination system, or the like. Any suitable indication of actual aircraft ground speed will provide a proper input at this point. The signal passes through a filter network comprising resistor R1 and capacitor C1 to take noise, etc., out of the aircraft speed signal. Capacitor C2 is the deceleration rate detector capacitor, and CR1 in combination therewith allows fast charging of this capacitor. The deceleration signal $dV/dT$ represents an instantaneous rate of aircraft deceleration.

As long as this rate of deceleration is within a predetermined minimum, capacitor C2 will discharge by means of current supplied through transistor Q1 and its associated components which in effect provide a current limiting circuit. The predetermined setting of this circuit is provided by a resistor R4, as this provides in combination with CR2 and CR3 a voltage level regulation to set the current threshold on Q1. The resistor R3 acts as a current limiting resistor for the base of transistor Q1. The invention contemplates that a preselected deceleration rate might be to not exceed 12 feet per second, and hence resistor R4 which is adjustable is set to limit the current supply through Q1 so as not to exceed this amount of current supply to capacitor C2. When the deceleration is greater than 12 feet per second per second, which would amount to approximately a 19 microamps current passage through Q1, the addititional discharge current required by C2 is supplied through R2 causing conduction of Q2, Q3 and Q4.

Resistor R6 sets a base bias for the operation of Q2 so that at least some voltage is required before Q2 will begin to conduct. This setting automatically eliminates lower frequency noises such as gear walk, and thus eliminates possible minor fluctuations which would indicate that the deceleration signal should be applied. In other words then, it should be understood that resistor R4 sets a current threshold for transistor Q1 whereas resistor R6 sets a voltage threshold for transistor Q2. Both these thresholds must be exceeded by unbalance at point A before transistor combination Q2–Q4 will begin to conduct.

Resistor R8 is utilized for bypassing leakage current around the emitter base of transistor Q3 to prevent erroneous amplification by Q3, and resistor R9 bypasses the base emitter of Q4 for the same reason. Resistor R7 is a feedback resistor to establish the gain of the amplifier and works in conjunction with R2 to set or limit the voltage gain of the amplifier, which is conventional in this type of amplifying circuitry. Capacitor C3 bypasses high frequencies for amplifier stabilization. Resistor R10 is a load resistor for transistor Q4 and bypasses leakage for transistor Q8 in the current control circuit 36. Diode CR4 compensates for the temperature of the emitter base junction of transistor Q8 in the current control circuit 36.

Hence, it should be understood that the output from point B to the current control circuit 36 will be directly dependent upon the unbalance which is achieved at point A when the current threshold through Q1 is exceeded, and the voltage threshold supplied by R6 to the base of Q2 is also exceeded. The amplification of the current flow through Q2 by Q3 and Q4 to point B causes this current to be a direct indication of the deceleration of the aircraft above a certain threshold limit, which as described above will normally fall in a range between 12 to 14 feet per second per second.

Figure 4:
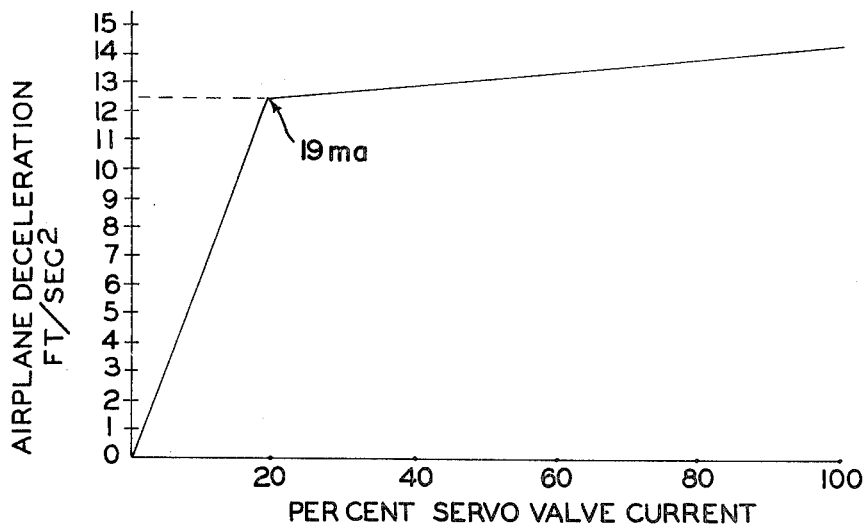
FIG. 4 is a graph showing airplane deceleration as related to servo valve current for the circuit of the invention.

FIG. 4 is a graphic illustration of how the servo valve current is limited by the deceleration signal from point B of the deceleration circuit 44 to the current control circuit 36. Specifically, the graph illustrates the percentage of servo valve current as the abscissa and the airplane deceleration in feet per second per second as the ordinate. It should be noted that the servo valve current is practically zero indicating a full braking application until the deceleration just slightly exceeds 12 feet per second per second at which time the servo valve current is abruptly and very positively increased, as is illustrated by the nearly horizontal portion of the graph. The point where the graph changes from nearly vertical to nearly horizontal would be that point at which the 19 ma. supplied over transistor Q1 to point A would be exceeded. Naturally, the slope of the graph of FIG. 4 is dependent upon the circuit parameters and the ability of the transistors to pass enough current as airplane deceleration continues to completely dump the servo valve current.

In all probability, because of the reaction times of the circuit, the percentage of servo valve current will never get to even the 50% point on the graph slope because the airplane deceleration will not continue to increase so rapidly. It is also well within the skill of those in the art to actually limit the total percent of servo valve current so as to eliminate the possibility of a complete dump in case of possible circuit failures indicating high deceleration rates when such were actually not occurring. In this event, perhaps a 50% servo valve current increase would be the limiting point, and the circuit parameters would be adjusted accordingly.

The invention contemplates that the servo valve should be a pressure controlled type giving linear pressure versus current characteristics with full energizing current producing zero pressure output. The potentiometer 30 must be a precision unit with a separate potentiometer actually associated with each skid control circuit 20 that normally are necessary for each pair of wheels associated with an aircraft. Naturally, however, it should be understood that by utilizing an electrical control for the manual control of the pilot, a great deal of hydraulic valves and piping are eliminated which cuts down the cost of the system, as well as the overall weight which are extremely important requirements in aircraft brake design.

Actually, it should be understood that the deceleration control circuit 44 is set up to limit the aircraft deceleration rate to a minimum number of feet per second per second. Preferably, deceleration rates above a circuit threshold of about 12.2 feet per second per second will reduce the available brake pressure proportionately to a level that will limit the aircraft deceleration to between predetermined limits of preferably 12.2 and 13.6 feet per second per second (this corresponding to .38 $g$ to 48 $g$). The nose wheel speed may be detected by the use of a standard pulse type speed sensing arrangement using an exciter ring on the co-rotating axle and a senser coil, in much the same manner as shown in U.S. Pat. 3,233,946.

While in accordance with the patent statutes only the best known embodiments of the invention have been illustrated and described in detail, it is to be particularly understood that the invention is not limited thereto or thereby but that the inventive scope is defined in the appended claims.

What is claimed is:

1. In an automatic vehicle brake control system the combination of
    first means to measure rate of braked wheel rotation and present it as an electrical signal,
    second means to control the application of braking energy to the braked wheels dependent on the electrical signal from the first means which is characterized by
    third means to independently determine the ground speed of the vehicle, and
    a deceleration control circuit actuated by the third means which provides override control to the second means to limit the deceleration of the vehicle to a maximum predetermined rate or deceleration.

2. A system according to claim 1 which includes manual means to provide the application of braking energy characterized by a hydraulic pressure system, an electrically operated servo valve to control the flow of hydraulic pressure from the system, and a manually controllable potentiometer to directly control the electrical supply to the servo valve except for the action of the second means, and the deceleration control circuit.

3. A system according to claim 1 where the deceleration control circuit includes a capacitor charged by the third means, and a transistor to maintain current to the capacitor on the variation of the signal by the third means, but which transistor is set to a level so it will not be adequate to maintain current to the capacitor when the deceleration rate of the vehicle exceeds about 12 feet per second per second.

4. A system according to claim 3 which includes a circuit to set a threshold for noise in the deceleration control circuit, said circuit including a variable resistor to set a voltage threshold on an amplifying transistor connected to the output of the capacitor.

5. In an automatic brake control system for a vehicle the combination of
    at least one rotatable wheel supporting the vehicle on the ground,
    brake means associated with each wheel,
    means to actuate the brake means controllable by the operator of the vehicle,
    first circuit means to measure the rate of rotation of each wheel,
    second circuit means to limit the means to actuate the brake means based on the information from the first circuit means which is characterized by
    a third circuit means to limit the rate of vehicle deceleration to a predetermined maximum and which third circuit means acts as an overriding control to the second circuit means.

6. A system according to claim 5 where the means to actuate the brake means is an electrical potentiometer, and the brake means is a hydraulic pressure source acting through an electrically controlled servo valve.

7. A system according to claim 6 which third circuit means includes an adjustable resistor to set maximum current flow through a transistor, a capacitor charged by an electrical signal dependent upon aircraft speed with the electrical balance on the capacitor being maintained by current flow through the transistor until its maximum flow is exceeded.

8. A system according to claim 6 which includes circuit means to provide a constantly repetitious current to the servo valve for all positions of the potentiometer regardless of minor changes in the supply voltage or ambient temperature.

9. A system according to claim 5 which includes means to determine vehicle speed which comprises
 a non-braked rotatable wheel adapted to contact the ground, and
 means to measure the rate of rotation of such non-braked wheel during vehicle movement on the ground and produce an electrical signal proportional thereto.

10. A system according to claim 9 where the electrical signal charges a capacitor, and where discharge of such capacitor is by current supplied by a transistor, and a variable resistor to determine and set a threshold for the maximum current passage of such transistor.

References Cited

UNITED STATES PATENTS

| | | | |
|---|---|---|---|
| 3,362,757 | 1/1968 | Marcheron | 303—21 |
| 3,394,967 | 7/1968 | Lucien | 303—21 |

DUANE A. REGER, Primary Examiner

U.S. Cl. X.R.

244—111; 303—20